Patented Sept. 15, 1953

2,652,334

UNITED STATES PATENT OFFICE 2,652,334

COMPOSITION FOR COLORING MARGARINE

William E. Barch, Bronx, N. Y., assignor to Standard Brands Incorporated, New York, N. Y., a corporation of Delaware No Drawing. Application August 13, 1949, Serial No. 110,221

6 Claims. (Cl. 99—148)

This invention relates to a composition for coloring margarine and to the packaging of margarine with such a composition.

It is common practice to supply the purchaser of uncolored margarine with a quantity of yellow dye for use in coloring the same. The margarine and the dye may be packaged separately or they may be packaged together in the manner described in Patent No. 2,469,204 issued May 3, 1949, to Leo Peters. In the former case, the dye may be supplied, for example, in liquid form in a gelatin capsule or as a powder in a paper envelope. The disadvantages of this practice are that separate packages are required which necessitate separate handling and it is practically impossible to remove the dye from its container without getting some on the hands.

These disadvantages are overcome by the use of the bag described in the Peters patent. Peters provides a sealed bag of a tough flexible material such as rubber or vinylite containing both the margarine and the coloring material, the latter being in a gelatin capsule which is held in a compartment formed by attaching a perforated patch to the inside surface of the bag. The user releases the coloring material by pinching the capsule and then the dye is distributed throughout the margarine by kneading the package. The disadvantages of this type of bag are that it is necessary to provide it with a separate compartment for the dye capsule, and an unsightly stain is left by the retention of a certain amount of dye by the capsule and on the interior surface of the capsule chamber.

These disadvantages are overcome by the present invention, which provides a coloring composition in the form of a pellet or other aggregate which can be kept in direct contact with, and in fact, embedded in, the margarine for long periods of time without substantial diffusion of color into the margarine.

The coloring composition is composed of an edible thixotropic aqueous gel having dispersed therein a powdered dye which is soluble in the fatty phase of margarine but insoluble in water. The gel serves to prevent diffusion of the dye into the margarine and yet, when subjected to agitation as by kneading, it liquefies and in this state can be readily mixed into the margarine at room temperature. Immediately after mixing, the dye particles appear in this mixture as fine undissolved specks which will not dissolve completely for some time. Therefore it is preferable to emulsify in the gel a small quantity of a fatty material which promotes rapid solution of the dye in the margarine probably by breaking the otherwise strong bond between the dispersed dye particles and the gel.

As a gelling agent any material can be used which is edible and will give an aqueous gel which liquefies on gentle agitation or manipulation.

The preferred gelling material is the reaction product of a partially deesterified pectin and an edible water-soluble salt of calcium, magnesium or other appropriate metal ion. Other suitable gels include those from modified starches and marine gums prepared from sea weeds.

The fatty material emulsified in the gel may be any animal or vegetable fat or oil, for example, corn oil and cottonseed oil, or the mono or poly esters of the polyhydric alcohols and the higher fatty acids, for instance, the mono-, di- and triglycerides of oleic and stearic acids.

To prepare the composition, the gelling agent is dissolved in water and before the gel sets, the powdered dye is dispersed in the solution. If fatty material is to be included, it can be mixed in with the dye or afterwards but it is preferable to first emulsify the fatty material and then incorporate the powdered dye in this emulsion.

An example of a suitable composition is as follows:

| | Percent by weight |
|---|---|
| Water | 75.80 |
| 3.7% solution of $CaCl_2 \cdot 2H_2O$ | 1.60 |
| Low methoxyl pectin | 0.80 |
| Sodium chloride | 0.40 |
| Cottonseed oil | 14.40 |
| Dye | 0.40 |
| Cornstarch | 0.57 |
| | 6.43 |

This composition was prepared as follows. The low methoxyl pectin was first dissolved in water heated to approximately 70° C. in a vessel equipped with an ultra high speed stirrer. The other components were then dissolved or emulsified in the following order:

Sodium chloride
Cottonseed oil
Dye
Starch
Calcium chloride each component being completely dissolved or emulsified before adding the next. After adding the calcium chloride solution the starch was gelatinized by heating the mixture to 90° C. and holding it at this temperature until there was no further increase in viscosity. The composition was then poured into molds where it was allowed to set into aggregates of suitable size and shape. A 2 gram pellet with a yellow dye is sufficient to impart to one pound of margarine the yellow shade of the ordinary commercial product.

It is not necessary to include the sodium chloride or the starch although it is preferable to use them. The sodium chloride concentration in the composition is approximately that of the sodium chloride in the water phase of the margarine. When the pellet is in contact with margarine the sodium chloride prevents water transfer from the pellet to the margarine which would increase the pectin concentration and cause the pellet to harden. Edible inorganic salts other than sodium chloride may be used to prevent water transfer, if desired.

Low methoxyl pectin gels are slippery and break up into small fragments when subjected to pressure. These fragments are difficult to chase and press out individually when the margarine bag is manipulated. When starch is included in the composition the breakdown on pressure is smooth and liquid. Other starches may be used in place of cornstarch.

Any partially deesterified pectin may be used which is capable of being gelled by calcium ions in the absence of sugar, and preferably those having a methoxyl content between about 2.5% and about 6.5%. The preparation and characteristics of deesterified pectins are well known and are described, for instance, in U. S. Patents Nos. 2,133,273 and 2,233,574 to Baker and Goodwin; and the articles by McCready, Owens and Maclay in Food Industries, vol. 16, 1944, pages 794–796; 864–865; 906–908. The amount of pectin used will depend upon its methoxyl content and the deesterification method. In the case of L. M. Pectin No. 466, which is prepared by deesterification with alkali, has a methoxyl content of 4.5%, and is manufactured by the California Fruit Growers Exchange, a concentration of about 0.8% is satisfactory. To obtain the best results this pectin is preferably used in an amount less than 1% but not less than 0.5%. When 1% or more is used, the gel is rather hard and when dispersed in the margarine it leaves specks which take some time to dissolve. When less than 0.5% is used the gel is low in mechanical strength and therefore more difficult to handle.

The above formula specifies one part of cottonseed oil in 250, but as little as one part in 1000 has been found to be just as effective. It is remarkable that this small amount of fatty material which is sufficient to dissolve only a minute portion of the dye in the pellet should be so effective in promoting rapid solution of the dye in the bulk of the margarine. Several per cent and even larger amounts may be used although there is no advantage gained and there may be a risk of promoting diffusion.

To effect gelling with very soluble salts like calcium chloride, it is essential to use a dilute solution because of the local premature gelling which occurs at the point of contact when strong solutions of calcium chloride are added. Such local gel formation weakens the mechanical strength of the final product and may cause specks in coloring. The amount of calcium ions necessary for gelling varies with the type of low methoxyl pectin. In the case of the pectin specified in the above example, 20 mg. per gram are sufficient.

The composition described in the above example is a thick viscous liquid at 90° C. which can be readily poured. If kept agitated the viscosity does not change appreciably at lower temperatures down to about −10° C. The mixture starts to gel immediately below about 40–45° C. If unagitated. Gelling is progressive and reaches a maximum in about twelve hours. At maximum gel strength the pellet can be readily handled in the fingers. The freshly gelled mixture is much softer and should receive a minimum of handling. When agitated, the gel reverts to its previous liquid state. It will then gel again if left undisturbed. The water evaporates from the gels as readily as from an equivalent amount of a corresponding sodium chloride solution and precautions should be taken to prevent this, as otherwise an insoluble dehydrated skin may form which will leave specks when the margarine is colored.

In the preferred form of the invention, the coloring composition and the margarine are sealed within a bag or wrapper of a tough flexible thermo plastic material such as vinylite which is capable of withstanding the pressure of kneading. Margarine at room temperature is charged into the bag and a pellet of the gelled coloring composition is also placed in the bag. The end of the bag is then closed by heat-sealing.

For convenience in handling or storage the pellets may be frozen solid (they melt at −18° C.). If they are at a low temperature of, say, −10° C. to −18° C. when they are placed in the margarine as the bag is being filled, they become covered immediately with a layer of frozen margarine sufficient to protect them in the subsequent handling of the bag. The layer of frozen margarine also makes the pellet invisible on the bag surface after the margarine block congeals. If the pellets are placed in the bag at room temperature they lie in direct contact with the inner surface of the bag without an intervening margarine film and are subject to unequally distributed stresses with temperature changes in the margarine block.

The coloring composition may also be placed in a liquid state in the interior of a congealed block of margarine and permitted to gel there. For example, it can be injected into the block through a hollow needle.

I claim:

1. A composition for coloring margarine comprising an emulsion of a fatty material in a thixotropic aqueous gel of an edible metal salt of a partially deesterified pectin, said emulsion having dispersed therein a dye which is soluble in the fatty phase of margarine but insoluble in water.

2. A composition as claimed in claim 1 wherein the partially deesterified pectin has a methoxyl content of 2.5% to 6.5%.

3. A composition as claimed in claim 1 containing gelatinized starch.

4. A composition as claimed in claim 1 containing sodium chloride and gelatinized starch.

5. A composition as claimed in claim 1 wherein the metal of the salt is calcium.

6. A composition for coloring margarine comprising an emulsion of a fatty material in a thixotropic aqueous gel composed of a calcium salt of a partially deesterified pectin having a methoxyl content of about 4.5%, said emulsion having suspended therein a yellow dye which is soluble in the fatty phase of margarine but insoluble in water.

WILLIAM E. BARCH.

References Cited in the file of this patent

UNITED STATES PATENTS

| Number | Name | Date |
| --- | --- | --- |
| 1,388,174 | Denny | Aug. 23, 1921 |
| 2,454,420 | Adler et al. | Nov. 23, 1948 |
| 2,539,457 | Metheny et al. | Jan. 30, 1951 |